(12) United States Patent
Chung

(10) Patent No.: US 6,420,502 B1
(45) Date of Patent: Jul. 16, 2002

(54) LIVING FREE RADICAL INITIATORS BASED ON ALKYLPEROXYDIARYLBORANE DERIVATIVES AND LIVING FREE RADICAL POLYMERIZATION PROCESS

(75) Inventor: Tze-Chiang Chung, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 0 days.

(21) Appl. No.: 09/887,116

(22) Filed: Jun. 25, 2001

Related U.S. Application Data

(60) Provisional application No. 60/242,592, filed on Oct. 23, 2000.

(51) Int. Cl.$^7$ .................................................. C08F 4/52

(52) U.S. Cl. ........................ 526/196; 526/195; 526/184; 526/189; 526/197; 526/198; 526/217; 526/242; 526/303.1; 526/314; 526/328; 526/341; 526/346; 568/1; 568/6; 568/558

(58) Field of Search ................................. 526/184, 189, 526/196, 197, 198, 217, 242, 303.1, 314, 328, 341, 346; 568/1, 6, 558

(56) References Cited

U.S. PATENT DOCUMENTS

| | | | | |
|---|---|---|---|---|
| 3,141,862 A | | 7/1964 | Kirshenbaum et al. ..... | 260/45.5 |
| 3,265,765 A | | 8/1966 | Holden et al. ............... | 260/876 |
| 3,387,018 A | * | 6/1968 | Parts ........................... | 260/453 |
| 3,476,727 A | | 11/1969 | Lo Monaco et al. ........ | 260/92.8 |
| 4,167,616 A | | 9/1979 | Bollinger .................... | 526/197 |
| 4,638,092 A | | 1/1987 | Ritter ........................... | 568/1 |
| 4,946,899 A | | 8/1990 | Kennedy et al. ............. | 525/244 |
| 5,286,800 A | | 2/1994 | Chung et al. ................ | 525/288 |
| 5,312,871 A | | 5/1994 | Mardare et al. ............. | 525/272 |
| 5,322,912 A | | 6/1994 | Georges et al. ............. | 526/204 |
| 5,401,804 A | | 3/1995 | Georges et al. ............. | 525/267 |
| 5,627,248 A | | 5/1997 | Koster et al. ................ | 526/217 |
| 5,708,102 A | | 1/1998 | Fryd et al. ................... | 526/172 |

OTHER PUBLICATIONS

Cannizzo et al. Block Copolymers Containing Monodisperse Segments Produced by Ring–Opening Metathesis of Cyclic Olefins *Macromolecules* 1998, 21, *Am. Chem. Soc.* 1999, vol. 121, No. 28, pp. 6763–6764.

Xu et al., Synthesis of Syndiotactic Polystyrene (s–PS) Containing a Terminal Polar Group and Diblock Copolymers Containing s–PS and Polar Polymers, *Macrolecules*, 1999, vol. 32, No. 25, 8689–8692.

Chung et al., A Novel "Stable" Radical Initiator Based on the Oxidation Adducts of Alkyl–9–BBN, *J. Am. Chem. Soc.* 1996, vol. 118, No. 3, 705–706.

Furukawa J., et al., Vinyl Polymerization. XIX. The Preparation of Block and Graft Copolymers Using Some Sulfur Compounds, *J. Polymer Sci.*, vol. 26, No. 113, pp. 236–234 (1957).

Rowen, J., et al.,Oxygen Compounds as Cocatalysts for Triethylboron–Catalyzed Vinyl Polymerization, *J. Polymer Sci.*, vol. 27, No. 116, pp 227–229 (1958).

Furukawa, J., et al., Catalytic Reactivity of Organometallic Compounds for Olefin Polymerization. III. Vinyl Polymerization by Organoboron Compounds, *Makromol. Chem,*, vol. 31, pp 122–138 (1960).

Welch, F. J. Polymerization of Methyl Methacrylate by Triethlboron–Oxygen Mixtures, *J. Polymer Sci.*, vol. 61, pp 243–252 (1962).

Otsu et al., Living Radical Polymerization in Homogeneous System by Using Iniferter: Design of Block Copolymers, *J. Macromoll. Sci.–Chem.*, A21 (8 & 9), pp. 961–977 (1984).

Otsu et al.,Synthesis, Reactivity, and Role of 4–Vinylbenzyl N,N–Diethyldithiocarbamate as a Monomer–Intiferter in Radical Polymerization, *Macrolecules*, 1986, 19, 287–290.

Otsu et al., Living Radical Polymerization Through the Use of Iniferters: Controlled Synthesis of Polymers, *Eur. Polym. J.*, vol. 25, No. 7:8, pp. 643–650, 1989.

Turner et al., Photoinitiated Block Copolymer Formation Using Dithiocarbamate Free Radical Chemistry, *Macrolecules*, 1990, 23, 1856–1859.

(List continued on next page.)

*Primary Examiner*—Helen L. Pezzuto
(74) *Attorney, Agent, or Firm*—Anthony J. DeLaurentis PA

(57) ABSTRACT

A new class of "living" free radical initiators that are based on alkylperoxydiarylborane and its derivatives and that may be represented by the general formula.

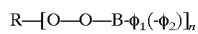

wherein n is from 1 to 4, R is a hydrogen or a linear, branched or cyclic alkyl radical having a molecular weight from 1 to about 500, and $\phi_1$ and $\phi_2$, independently, are selected from aryl radicals, based on phenyl or substituted phenyl groups, with the proviso that $\phi_1$ and $\phi_2$ can be the chemically bridged to each other with a linking group or with a direct chemical bond between the two aryl groups to form a cyclic ring structure that includes a boron atom are disclosed. At ambient temperature the R—[O—O—B-$\phi_1$(-$\phi_2$)]$_n$ species spontaneously homolyzes to form an alkoxyl radical R—[O*]$_n$, which is active in initiating "living" polymerization of radical polymerizable monomers, and a "dormant" diarylborinate radical *O—B-$\phi_1$(-$\phi_2$), which is too stable to initiate polymerization due to the back-donating of electron density to the empty p-orbital of boron, but which may form a reversible bond with the radical at the growing polymer chain end to prevent undesirable side reactions. The "living" radical polymerization is characterized by a linear increase of polymer molecular weight with monomer conversion, a narrow molecular weight distribution, and the formation of block copolymers by sequential monomer addition.

7 Claims, 5 Drawing Sheets

OTHER PUBLICATIONS

Moad et al., A Product Study of the Nitroxide Inhibited Thermal Polymerization of Styrene, *Polymer Bulletin*, 6, 589–593 (1982).

Georges et al., Narrow Molecular Weight Resins by a Free–Radical Polymerization Process, *Macrolecules*, 1993, 26, 2987–2988.

Hawker,Molecular Weight Control by a "Living" Free–Radical Polymerization Process, *J. Am. Chem. Soc,* 1994, 116, 11185–11186.

Wang et al., Controlled/ "Living" Radical Polymerization. Halogen Atom Transfer Radical Polymerization Promoted by a Cu(I)/Cu(II) Redox Process, *Macrolecules,* 1995, 28, 7901–7910.

Wang et al.,Controlled/"Living" Radical Polymerization. Atom Transfer Radical Polymerization in the Presssence of transition–Metal Complexes, *J. Am. Chem. Soc.* 1995, 117, 5614–5615.

Kato et al.Polymerization of Methyl Methacrylate with the carbon Tetrachloride/Dichlorotris(triphenylphosphine)ruthenium(II)/Methylal minum Bis(2,6–di–tert–butylphenoxide) Initiating System: Possibility of Living Radical Polymerization, *Macrolecules,* 1995, 28, 1721–1723.

Percec et al., "Living" Radical Polymerization of Styrene Initiated by Arenesulfonyl Chlorides and $Cu^I(bpy)_nCl$, *Macrolecules,* 1995, 28, 7970–7972.

Granel et al.,Controlled Radical Polymerization of Methacrylate Monomers in the Presence of a Bis(ortho–chelated) Arylnickel(II) Complex and Different Activated Alkyl Halides, *Macrolecules,* 1996, 29 8576–8582.

Chung et al.,Synthesis of Polypropylene–graft–poly(methyl methacrylate) copolymers by the Borane Approach, *Macrolecules,* 1993, 26, 3467–3471.

Chung et al., A novel synthesis of PP–b–PMMA copolymers via metallocene catalysis and borane chemistry, *Polymer,* vol. 38, No. 6, pp. 1495–1502, 1997.

Lu et al.,Maleic Anhydride Modified Polypropylene with Controllable Molecular Structure: New Synthetic Route via Borane–Terminated Polypropylene, *Macromolecules,* vol. 31, No. 17, pp. 5943–5946, 1998.

Xu et al.,Borane Chain transfer Agent in Metallocene–Mediated Olefin Polymerization. Synthesis of Borane–Terminated Polyethylene and Diblock Copolymers Containing Polyethylene and Polar Polymer, J.

Ritter et al.,Synthese und Strukturuntersuchung des Poly(1–hydroxytetramethylen)s, *Makromol. Chem.*, vol. 178, pp 2837–2842 (1977).

\* cited by examiner

US 6,420,502 B1

LIVING FREE RADICAL INITIATORS BASED ON ALKYLPEROXYDIARYLBORANE DERIVATIVES AND LIVING FREE RADICAL POLYMERIZATION PROCESS

RELATED APPLICATION

This application is based on Provisional Application No. 60/242,592, filed on Oct. 23, 2000.

FIELD OF INVENTION

The invention relates to a new class of living free radical initiators that are based on alkylperoxydiarylborane derivatives with the general formula of R—[O—O—B-$\phi_1$(-$\phi_2$)]$_n$. The initiators exhibit living polymerization at ambient temperature to produce white solid vinyl polymers with predetermined molecular weight and narrow molecular weight distribution. By sequential monomer addition, the initiators also produce block copolymers with controlled copolymer composition and narrow molecular weight distribution.

BACKGROUND OF THE INVENTION

The control of polymer structure has been an important facet in polymer synthesis, both for academic interests and industrial applications. A living polymerization mechanism provides an optimal means for preparing polymers having well-defined molecular structures, i.e. molecular weight, narrow molecular weight distribution, polymer chain end, as well as for preparing block and star polymers. In the past, the most viable techniques in living polymerization reactions were mediated by anionic, cationic, and recently metathesis initiators [for anionic living polymerization, see Holden, et al, U.S. Pat. No. 3,265,765; for cationic living polymerization, see Kennedy, et al, U.S. Pat. No. 4,946,899; and for metathesis living polymerization, see R. H. Grubbs, et al, *Macromolecules*, 21, 1961 (1988)]. However, these polymerization processes are very limited to a narrow range of monomers, due to the sensitivity of active sites to functional (polar) groups.

In many respects, free radical polymerization is the opposite of living ionic and metathesis polymerizations since it is compatible with a wide range of functional groups, but offers little or no control over polymer structure. Despite this drawback, free radical polymerization is the preferred industrial choice in the commercial production of vinyl polymers, especially those containing functional groups.

Early attempts to realize a living free radical polymerization involved the concept of reversible termination of the growing polymer chains by iniferters, such as N,N-diethyldithiocarbamate derivatives [Otsu, et.al, *J. Macromol.Sci., Chem.,* A21, 961 (1984); *Macromolecules,* 19, 287 (1986); *Eur. Polym. J.,* 25, 643 (1989); Turner, et.al, *Macromolecules,* 23, 1856 (1990)]. However, this strategy suffered from poor control of polymerization reaction and polymer formed having high polydispersity.

The first living radical polymerization was observed in the reactions involving a stable nitroxyl radical, such as 2,2,6,6-tetramethylpiperidinyl-1-oxy (TEMPO), that does not react with monomers but forms a reversible end-capped propagating chain end [see, Moad, et.al, *Polymer Bull.,* 6, 589 (1082); Georges, et.al, *Macromolecules,* 26, 2987 (1993); Georges, et.al, U.S. Pat. Nos. 5,322,912 and 5,401,804; Hawker, et.al, *J. Am. Chem. Soc.,* 116, 11185 (1994); and Koster, et.al, U.S. Pat. No. 5,627,248]. The formed covalent bonds reduce the overall concentration of free radical chain ends, which leads to a lower occurrence of unwanted termination reactions, such as coupling and disproportionation reactions. For an effective polymerization, the reaction has to be carried out at an elevated temperature (>100° C.). Relatively high energy is needed in the cleavage of the covalence bond, which maintains a sufficient concentration of propagating radicals for monomer insertion. Furthermore, this living radical polymerization seems effective only with styrenic monomers.

Subsequently, several research groups have replaced the stable nitroxyl radical with transition metal species as the capping agents to obtain a variety of copper, nickel, iron, cobalt, or ruthenium-mediated living free radical systems, so-called atom transfer radical polymerization (ATRP) [see, Matyjaszewski, et.al, *Macromolecules,* 28, 7901 (1995); *J. Am. Chem. Soc.,* 117, 5614 (1995); Mardare, et.al, U.S. Pat. No. 5,312,871; Sawamoto, et.al, *Macromolecules,* 28, 1721 (1995); Percec, et.al, *Macromolecules,* 28, 7970 (1995); Teyssie, et.al, *Macromolecules,* 29, 8576 (1996); and Fryd, et.al, U.S. Pat. No. 5,708,102]. Overall, all of these systems have a central theme, i.e., reversible termination via equilibrium between active and dormant chain end at an elevated temperature, which is regulated by a redox reaction involving metal ions. The main advantage of this reaction is that, through a proper choice of the metal compound, it is possible to operate with a broad spectrum of monomers. However, a major drawback is the formation of a deep colored reaction mixture that requires extensive purification procedures to obtain the desired final product.

It has also been known that trialkyborane in an oxidized state becomes an initiator for the polymerization of a number of vinyl monomers [see Furukawa, et al, J. Polymer Sci., 26, 234, 1957; J. Polymer Sci. 28, 227, 1958; Makromol. Chem., 40, 13, 1961; Welch, et.al, J. Polymer Sci. 61, 243, 1962 and Lo Monaco, et. al. U.S. Pat. No. 3,476,727]. The polymerization mechanism involves free radical addition reactions. The initiating radicals may be formed from homolysis of peroxyborane or by the redox reaction of the peroxyborane with unoxidized trialkylborane. A major advantage of borane initiators is the ability to initiate the polymerization at low temperature. Peroxides and azo initiators, when used alone, usually require considerable heat input to decompose and thereby to generate free radicals. Elevation of the temperature often causes significant reduction in molecular weight of the polymer accompanied by the loss of important properties of the polymer.

U.S. Pat. No. 3,141,862 discloses conducting a trialkylborane-initiated free radical polymerization in the presence of an alpha-olefin hydrocarbon polymer. Apparently, the graft-onto reaction by this route was very difficult. The inert nature and insolubility of polyolefin (due to crystallinity) also seems to have hindered the process and resulted in very poor graft efficiency. The reactions shown in the examples of this patent also seem to require a very high concentration of organoborane initiator and monomers and to require elevated temperature. The majority products are homopolymers or insoluble gel. No information about the molecular structure of copolymers is provided in this patent.

Despite the advantage of borane initiators, organoborane-initiated polymerizations tend to be unduly sensitive to the concentration of oxygen in the polymerization system. Too little or too much oxygen results in little or no polymerization. High oxygen concentration causes organoborane to be transfered rapidly to borinates, boronates and borates that are poor initiators at low temperature. Moreover, polymerization is often inhibited by oxygen. To facilitate the formation of free radicals, some borane-containing oligomers and polymers [see Bollinger, et.al. U.S. Pat. No. 4,167,616 and Ritter, et.al. U.S. Pat. No. 4,638,092] were used as initiators in the free radical polymerizations. These organoboranes are prepared by the hydroboration of diene monomers or polymers or copolymers. Similar polymeric organoborane adducts, prepared by the hydroboration of 1,4-polybutadiene and 9-borabicyclo(3,3,1)-nonane (9-BBN), have also been reported in *Macromol. Chem.*, 178, 2837, (1977).

In the past decade, we have been focussing on the selective oxidation of trialkylborane and studying the mono-oxidative adducts as a new free radical initiation system. The research objective was centered around the functionalization of polyolefins by first incorporating borane groups into a polymer chain, which was then selectively oxidized by oxygen to form the mono-oxidized borane moieties that initiate free radical graft-from polymerization at ambient temperature to form polyolefin graft and block copolymers [Chung, et.al, U.S. Pat. Nos. 5,286,800 and 5,401,805; *Macromolecules*, 26, 3467 (1993); *Polymer*, 38, 1495 (1997); *Macromolecules*, 31, 5943(1998); *J. Am. Chem. Soc.*, 121, 6763 (1999); *Macromolecules*, 32, 8689(1999)]. Overall, the reaction process resembles a transformation reaction from transition metal (metallocene) coordination polymerization to free radical polymerization via the incorporated organoborane groups. Several years ago, a relatively stable radical initiator was discovered, i.e., the oxidation adducts of alkyl-9-borabicyclononane (alkyl-9-BBN) [Chung, et.al, *J. Am. Chem. Soc.*, 118, 705(1996)]. This initiator exhibits the radical polymerization of methacrylate monomers with a linear relationship between polymer molecular weight and monomer conversion in the range of low (<15%) monomer conversion. The polymers formed during the polymerization show a stable but relatively broad molecular weight distribution (Mw/Mn >2.5), compared to polymers prepared by living polymerization processes. This initiator is also incapable of producing block copolymers by sequential monomer addition, indicating limited stability at the propagating chain end.

SUMMARY OF THE INVENTION

It is an objective of the present invention to provide a new class of living free radical initiators, based on alkylperoxydiarylboranes, which are pure mono-oxidized borane compounds and can initiate living polymerization at ambient temperature to produce vinyl polymers having a white solid form without the need for performing any purification procedures. The general formula of the alkylperoxydiarylborane derivatives is illustrated below:

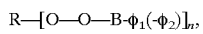

$R-[O-O-B-\phi_1(-\phi_2)]_n$, wherein n is from 1 to 4, preferably n is 1 or 2; R is a hydrogen or a linear, branched or cyclic alkyl radical having a molecular weight from 1 to about 500, and $\phi_1$ and $\phi_2$, independently, are selected from aryl radicals, based on phenyl or substituted phenyl groups, with the proviso that $\phi_1$ and $\phi_2$ can be the chemically bridged to each other with a linking group or with a direct chemical bond between the two aryl groups to form a cyclic ring structure that includes a boron atom. The alkylperoxydiarylboranes may be prepared, for example, by (i) the selective oxidation of alkyldiarylborane by oxygen and by (ii) the condensation reaction between halodiarylborane and alkylhydroperoxide (or the corresponding alkali metal salt).

It is another objective of this invention is to provide a process for polymerizing vinyl monomers by a "living" free radical polymerization process to prepare vinyl homopolymers and copolymers, including block and star-shape copolymers, having well-defined molecular structures, i.e., pre-determined molecular weight and narrow molecular weight distribution. The process involves contacting a mixture comprising one or more free radical polymerizable monomers with an alkylperoxydiarylborane initiator of the present invention at ambient temperature.

The free radical polymerizable monomers contemplated for use in this invention include, for example, methyl methacrylate, ethyl methacrylate, butyl methacrylate, octyl methacylate, methacrylic acid, methyl acrylate, ethyl acrylate, butyl acrylate, octyl acrylate, 2-hydroxyethyl acrylate, glycidyl acrylate, acrylic acid, maleic anhydride, vinyl acetate, acrylonitrile, acrylamide, vinyl chloride, vinyl fluoride, vinylidene difluoride, 1-fluoro-1-chloro-ethylene, 1-chloro-2,2-difluoroethylene, chlorotrifluoroethylene, trifluoroethylene, tertrafluoroethylene, hexafluoropropene, styrene, alpha-methyl styrene, substituted styrene, trimethoxyvinylsilane, triethoxyvinylsilane and the like. The radical polymerizable monomers may be used either singly, or as a combination of two or more different monomers.

In the polymerization at ambient temperature, the initiator $(R-[O-O-B-\phi_1(-\phi_2)]_n)$ spontaneously homolyzes at the peroxide bond to form an alkoxyl radical $(R-[O^*]_n)$ and an diarylborinate radical $(*O-B-\phi_1(-\phi_2))$. The alkoxyl radical is active in initiating polymerization of the vinyl monomers. On the other hand, the diarylborinate radical is too stable to initiate polymerization due to the back-donating of electron density to the empty p-orbital of boron. However, this "dormant" borinate radical may form a reversible bond with the alkoxyl radical at the growing polymer chain end to prevent unwanted termination reactions. This "living" radical polymerization is characterized by a linear increase of polymer molecular weight with monomer conversion, and by a narrow molecular weight distribution (Mw/Mn <2.0, typically <1.5, preferably <1.2), as well as the production of block copolymers by sequential monomer addition.

DETAILED DESCRIPTION OF THE INVENTION

Figure 1:
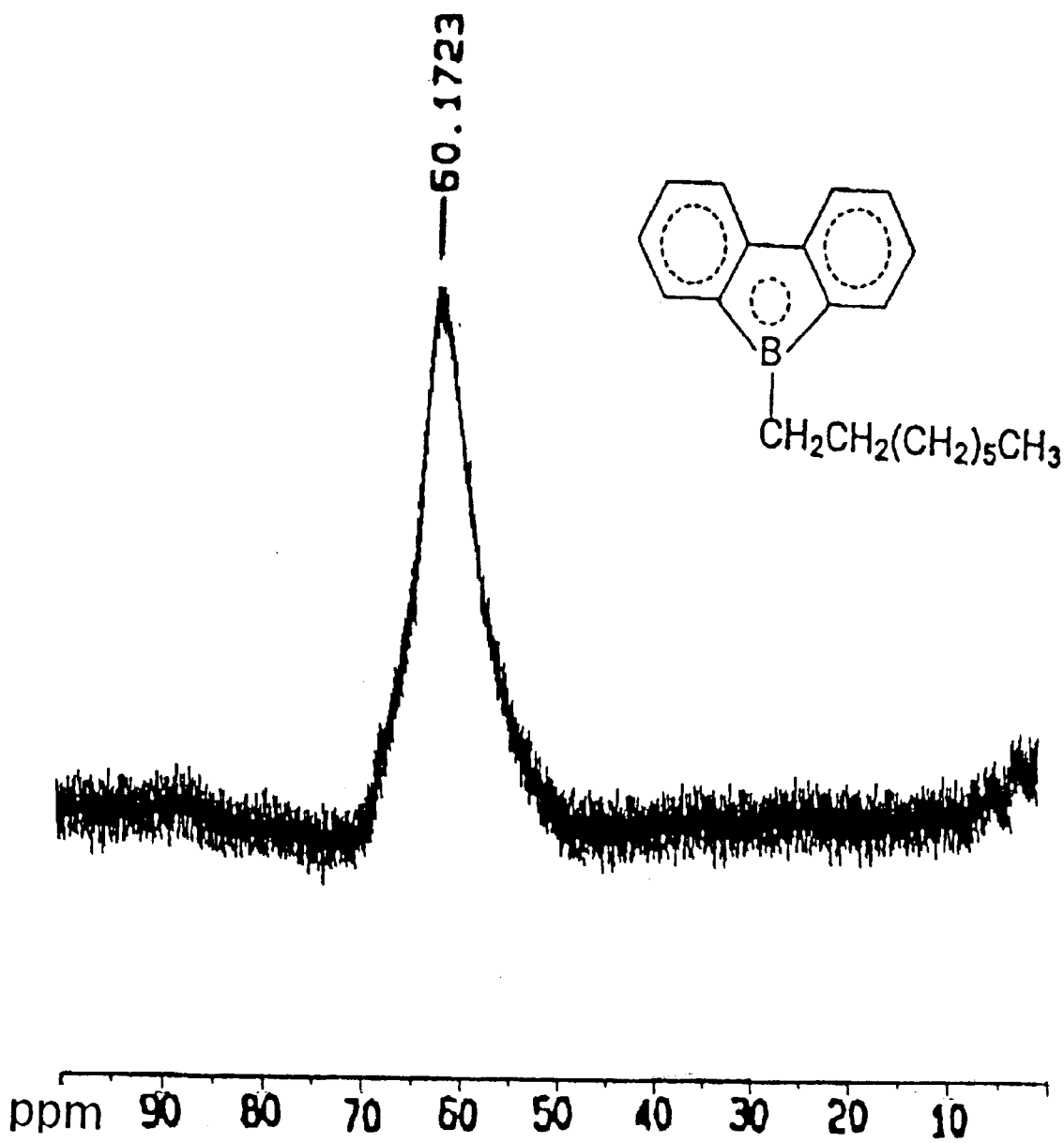
FIG. 1 illustrates the $^{11}B$ NMR spectrum of 1-octyl-9-borafluorene.

The synthesis of well-defined polymers having accurately controlled molecular structures is an important subject in polymer science due to the desire to prepare materials with new and/or improved physical properties. The issue is particularly important in free radical polymerization because it is a preferred industrial process for producing vinyl polymers. In addition, free radical initiators are useful with a broad range of vinyl monomers, including monomers containing polar groups.

This invention discloses a new class of "living" radical initiators that can initiate living radical polymerization at ambient temperature and produce high molecular weight polymers having well-defined molecular structures, i.e. predetermined molecular weight and narrow molecular weight distribution (preferably Mw/Mn <1.2). With a sequential monomer addition process, the living propagating chain ends (after completing the polymerization of a first monomer) can cross over to react with a second monomer to produce a block copolymers. The block copolymers produced have narrow molecular weight distribution and well-controlled copolymer composition.

This new class of "living" radical initiators is based on an alkylperoxydiarylborane derivative. The general formula is illustrated below:

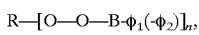

R—[O—O—B-$\phi_1$(-$\phi_2$)]$_n$, wherein n is from 1 to 4, preferably n is 1 or 2; R is a hydrogen (only in the case of n=1) or a linear, branched or cyclic alkyl group having a molecular weight from 1 to about 500; and $\phi_1$ and $\phi_2$, independently, are selected from aryl groups.

R groups contemplated for use in this invention include linear and branched alkyl groups, for example, methyl, ethyl, propyl, butyl, amyl, isoamyl, hexyl, isobutyl, heptyl, octyl, nonyl, decyl, cetyl, 2-ethylhexyl, etc., and cyclic alkyl radicals, for example, cyclopentyl, cyclohexyl, cyclooctyl, norbornyl, 1-methylnorbornyl, 5-methylnorbornyl, 7-methylnorbornyl, 5,6-dimethylnorbornyl, 5,5,6-trimethylnorbornyl, 5-ethylnorbornyl, 5-phenylnorbornyl and 5-benzylnorbornyl. In the multiple-functional initiators (n>1), the R group is employed to connect several peroxydiarylborane moieties. The molecular weight of R is below 500.

As used in connection with $\phi_1$ and $\phi_2$, the term "aryl group" is meant to include $C_6$ to $C_{30}$ aryl radicals, such as, for example, phenyl and substituted phenyl radicals ($C_6H_{5-x}R'_x$) with one to five substituent groups R'. Each substituent group R' is, independently, a radical selected from a group consisting of $C_1$–$C_{15}$ hydrocarbyl radicals, substituted $C_1$–$C_{15}$ hydrocarbyl radicals wherein one or more hydrogen atoms is replaced by a halogen radical, an alkoxy radical, an amido radical, and a phosphido radical. ($C_6H_{5-x}R'_x$) is also a phenyl ring in which two adjacent R'—groups are joined forming five to eight-member ring to give a saturated or unsaturated polycyclic phenyl group such as tetralin, indene, naphthalene, and fluorene. $\phi_1$ and $\phi_2$ also can be chemically bridged to each other with a linking group or with a direct chemical bond between the two aryl groups to form a cyclic ring structure that includes a boron atom.

Particularly suitable alkylperoxydiarylborane "living" free radical initiators are compounds containing borane moieties, illustrated below as compounds (I) and (II):

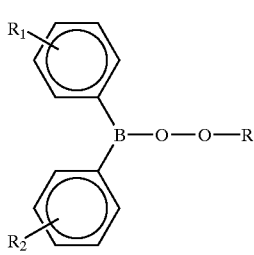

(I)

-continued

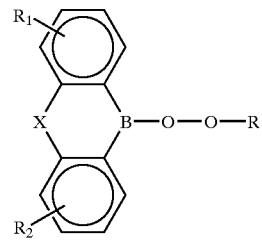

(II)

wherein $R_1$ and $R_2$ in compounds (I) and (II), independently, represent H or an alkyl, aryl or alkoxyl substituent having from 1 to 15 carbon atoms, and preferably from 1 to 8 carbon atoms, with $R_1$ and $R_2$ being located at all five substitution locations on the respective aryl ring structures; and wherein X in compound (II) is a linking group selected from a direct chemical bond, —O—, —N(R")—, —Si(R"$_2$)— and —(CH$_2$)$_m$—, where R" is a $C_1$–$C_4$ alkyl group and m is 1, 2 or 3. The preferred initiators include alkylperoxydimesitylborane, 9-alkylperoxy-borafluorene, 1-alkylperoxy-2,3;5,6-dibenzoborine, 1-alkylperoxy-2,3;6,7-bibenzoborepin, and 1-alkylperoxy-2,3;6,7-bibenzodihydroborepin.

The alkylperoxydiarylborane "living" free radical initiators of the present invention may be prepared by (i) a selective oxidation of alkyldiarylborane by oxygen and by (ii) a condensation reaction between halodiarylborane and alkylhydroperoxide (or the corresponding alkali metal salt). The following equation illustrates the general reaction scheme for the preparation of an alkylperoxydiarylborane initiator within the scope of the invention, namely:1-octylperoxyl-9-borafluorene:

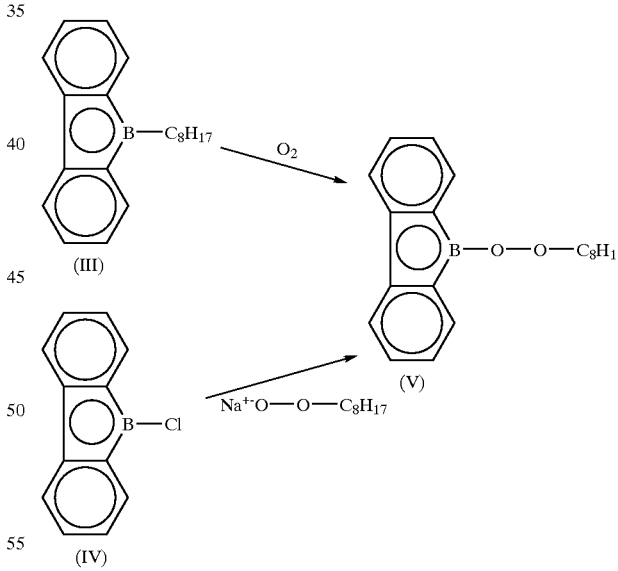

Figure 2:
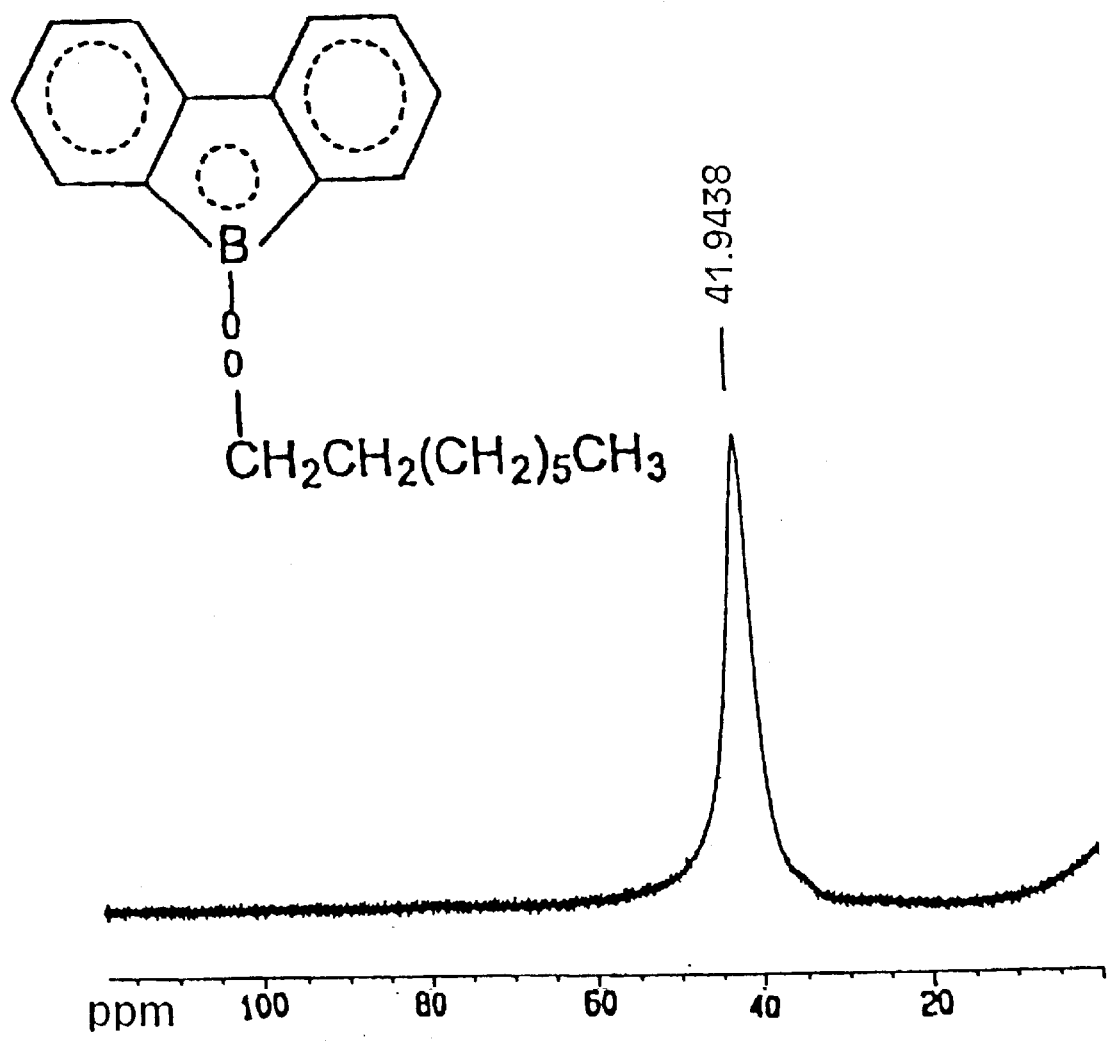
FIG. 2 illustrates the $^{11}B$ NMR spectrum of 1-octylperoxy-9-borafluorene.

Detailed preparation procedures for both precursors, i.e., 1-octyl-9-borafluorene (III) and 9-chloroborafluorene (IV), are discussed in the examples. At ambient temperature, a spontaneous oxidation reaction occurs upon mixing 1-octyl-9-borafluorene (II) with oxygen. Due to the two strong aryl-B bonds, the oxidation reaction selectively takes place at octyl-B bond to produce peroxyborane ($C_8$—O—O—B) (V). The effective and selective reaction is demonstrated by comparing the $^{11}$B NMR spectrum of a sample of the 1-octyl-9-borafluorene precursor (III) before the oxidation reaction (FIG. 1) with the $^{11}$B NMR spectrum of a sample of the 1-octylperoxyl-9-borafluorene initiator (V) after the oxidation reaction (FIG. 2). In FIG. 1b, the single chemical shift of 1-octyl-9-borafluorene (III) at 60 ppm (vs. etherated $BF_3$) indicates the strong π-electron delocalization around the B atom at the center five-member ring, which provides high bond order and good stability of aryl-B bonds. Upon oxidation, the chemical shift completely moves to a higher field at 42 ppm (FIG. 2), indicating a quantitative oxidation reaction to produce 1-octylperoxyl-9-borafluorene initiator (V).

Figure 4:
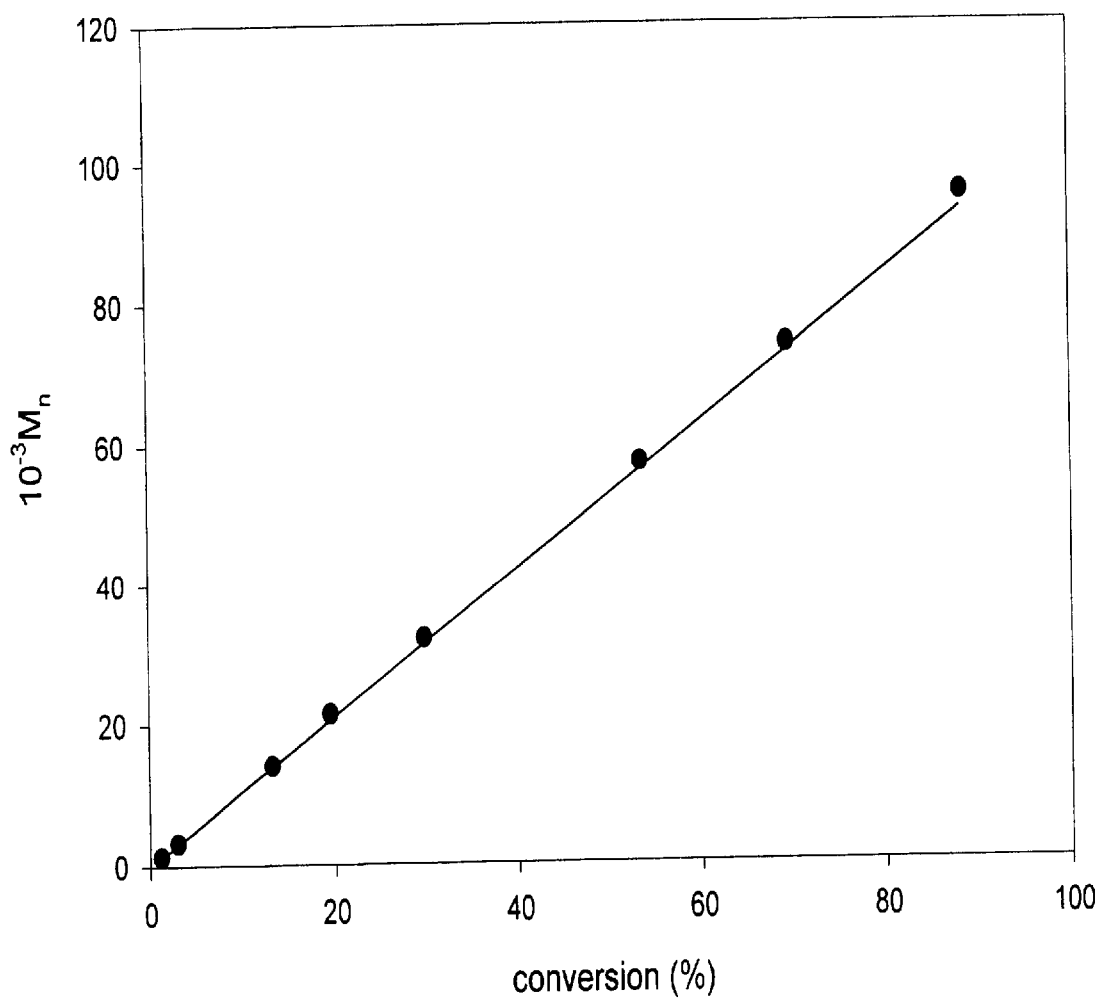
FIG. 4 is a plot of poly(methyl methacrylate) molecular weight vs. monomer conversion.

The 1-octylperoxyl-9-borafluorene initiator (V) behaves very differently from other living radical initiator systems, based on stable nitroxyl radical and transition metal species as the capping agents. This peroxyborane is a reactive radical initiator even at ambient temperature. As illustrated in the following equation, the 1-octylperoxyl-9-borafluorene initiator undergoes spontaneous hemolytic cleavage of the peroxide moiety to generate a reactive alkoxyl radical (C—O*) (VI) and a stable borinate radical (B—O*) (VII), due to the back-donating of electron density to the empty p-orbital of boron.

that polymer molecular weight continuously increases during the entire polymerization process, and that the molecular weight distribution remains quite constant and narrow, with Mw/Mn=~1.2. FIG. 4, which illustrates a plot of polymer molecular weight vs. monomer conversion, shows that all of the experimental data points fall almost exactly on the theoretical line, based on the calculation of [monomer consumed]/[initiator concentration]. A near ideal straight line through the origin provides strong evidence of living polymerization.

Thus, it has been found that the present "living" free radical initiators facilitate a "stable" radical polymerization process that occurs at ambient temperature. The peroxyborane initiator can be prepared prior to the polymerization or in situ prepared by injection of oxygen to monomers in the presence of an alkyldiarylborane, such as 1-octyl-9-borafluorene. The lack of chain-transfer and termination, both disproportionation and coupling reactions, is believed to associated with the existence of the "dormant" borinate radical (VII) species, serving as the reversible capping agent, that is produced in situ during the formation of initiator.

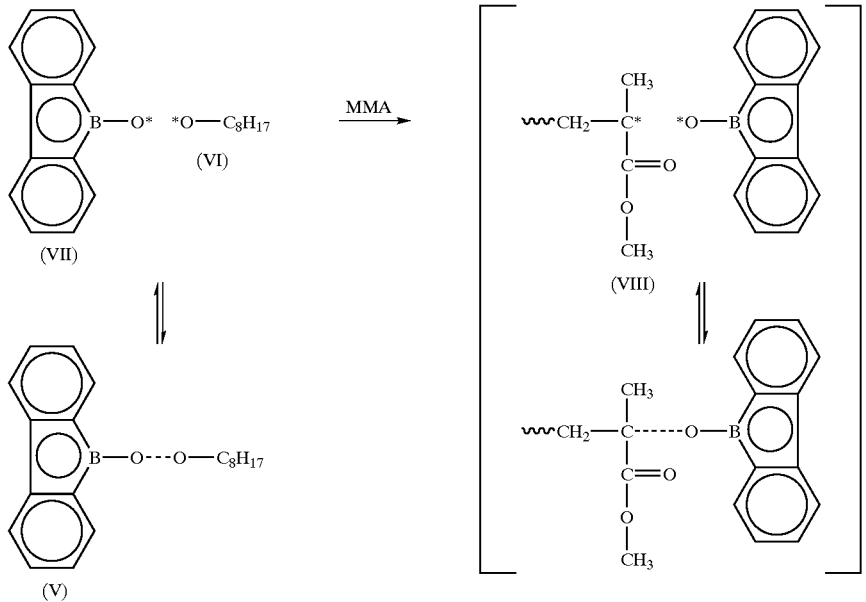

Figure 3:
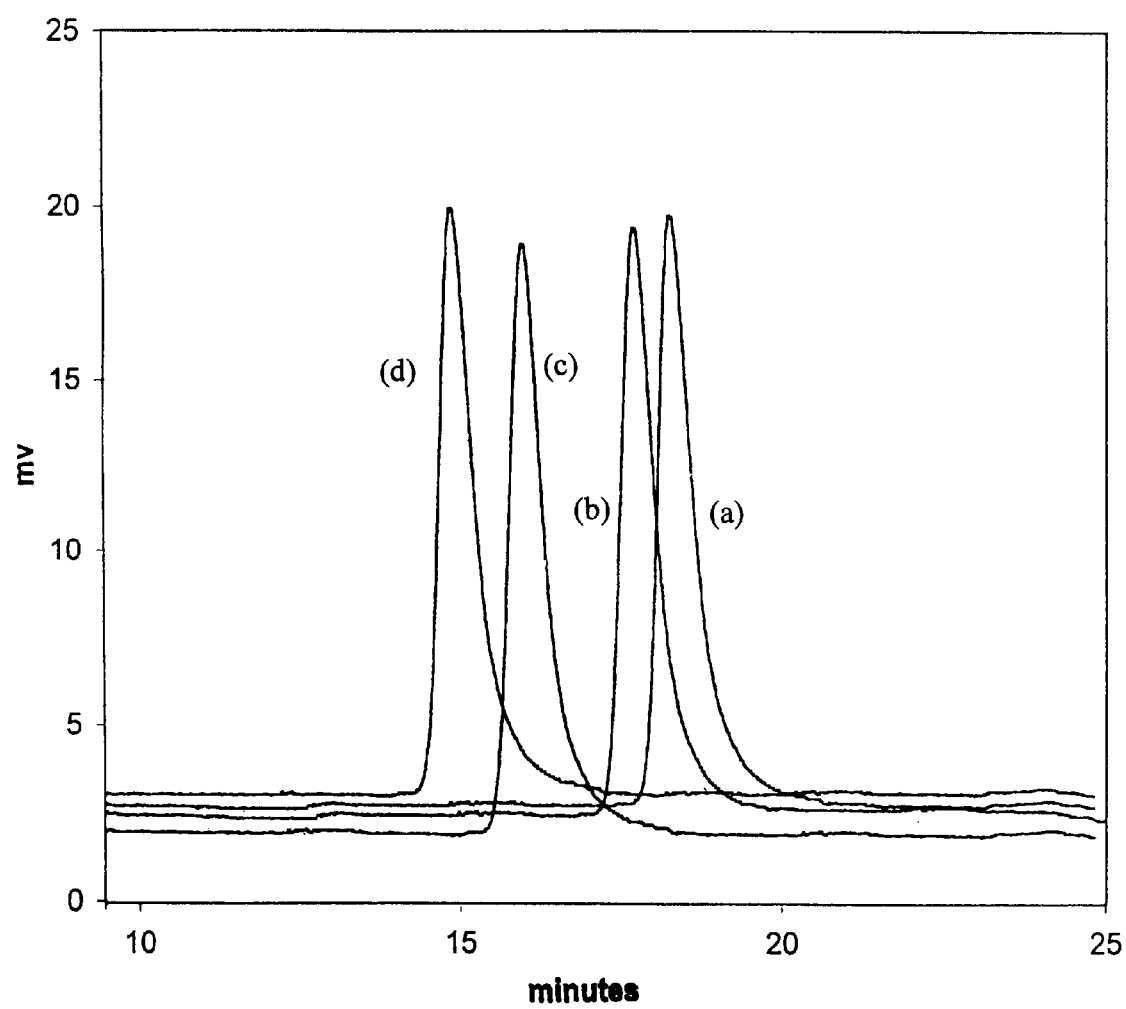
FIG. 3 illustrates GPC curves of poly(methyl methacrylate) polymer samples prepared in Example 7 (curve (a)), Example 8 (curve (b)), Example 10 (curve (c)), and Example 11 (curve (d))

The alkoxyl radical (VI) that is formed is very reactive to free radical-polymerizable monomers, such as methyl methacrylate (MMA) and initiates radical polymerization at ambient temperature. On the other hand, the borinate radical (VII) is too stable to react with free radical polymerizable monomers. However, the borinate radical (VII) serves as the end-capping agent to form a weak and reversible bond with the growing chain end (VIII) during the polymerization reaction. Upon the dissociation of an electron pair, the growing chain end (VIII) can then react with additional monomer, such as methyl methacrylate (MMA), to extend the polymer chain. The resulting new chain end radical immediately forms a weak bond with the borinate radical (VII). Such a process minimizes undesirable chain transfer reactions and termination (coupling and disproportionation) reactions between two growing chain ends. FIG. 3, which illustrates the GPC curves of poly(methyl methacrylate) polymers sampled during the polymerization reactions of Examples 7, 8, 10 and 11 herein below, clearly demonstrates The free radical polymerizable vinyl monomers contemplated for use in this invention include, for example, methyl methacrylate, ethyl methacrylate, butyl methacrylate, octyl methacylate, methacrylic acid, methyl acrylate, ethyl acrylate, butyl acrylate, octyl acrylate, 2-hydroxyethyl acrylate, glycidyl acrylate, acrylic acid, maleic anhydride, vinyl acetate, acrylonitrile, acrylamide, vinyl chloride, vinyl fluoride, vinylidene difluoride, 1-fluoro-1-chloro-ethylene, 1-chloro-2,2-difluoroethylene, chlorotrifluoroethylene, trifluoroethylene, tertrafluoroethylene, hexafluoropropene, styrene, alpha-methyl styrene, substituted styrene, trimethoxyvinylsilane, triethoxyvinylsilane and the like. These radical polymerizable monomers can be used either singly or as a combination of two or more monomers. The polymers formed from such monomers typically have from about 10 to about 100,000 repeating monomer units. Preferably the polymers contain from about 20 to about 30,000, and most preferably from about 50 to about 10,000 repeating monomer units.

Figure 5:
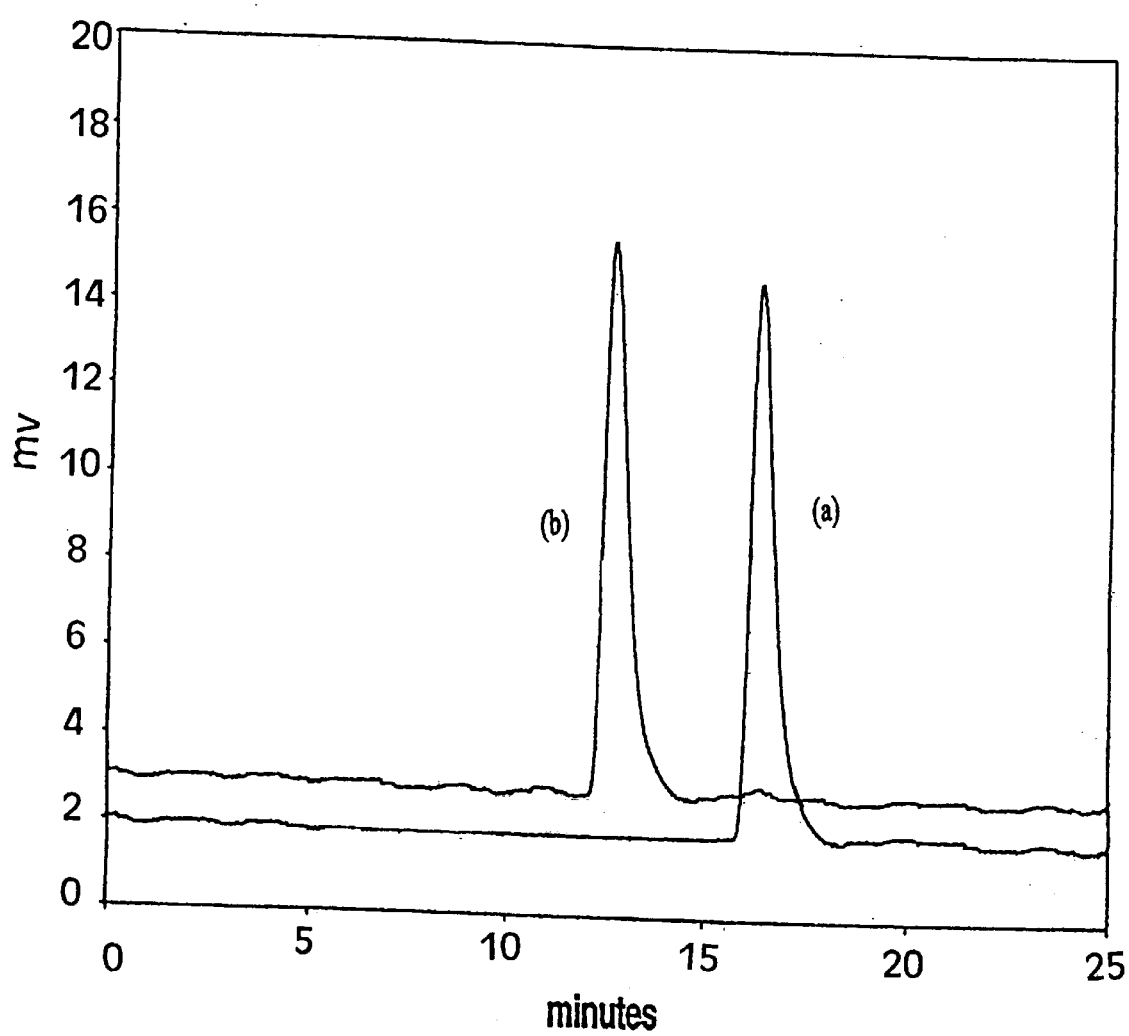
FIG. 5 illustrates GPC curves of (a) poly(methyl methacrylate) (Mn=52,000 g/mol, Mw/Mn=1.2) and (b) poly(methyl methacrylate-b-butyl methacrylate) ) (Mn=122, 000 g/mol, Mw/Mn=1.2).

The living radical polymerization of this invention is useful for preparing homoploymers and random copolymers. However, it is also useful for preparing block copolymers by means of sequential monomer addition. In other words, after completing the polymerization of a first monomer to the extent desired to form a first polymer "block", a second monomer is introduced into the reaction mass to effect polymerization of the second monomer to form a second polymer "block" that is attached to the end of the first block. Using this sequential addition process, a broad range of diblock, triblock, etc. copolymers can be prepared, which have following formula:

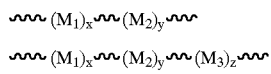

where $M_1$, $M_2$ and $M_3$ are independent monomer units chosen from free radical polymerizable monomers, such as methyl methacrylate, ethyl methacrylate, butyl methacrylate, octyl methacylate, methacrylic acid, methyl acrylate, ethyl acrylate, butyl acrylate, octyl acrylate, 2-hydroxyethyl acrylate, glycidyl acrylate, acrylic acid, maleic anhydride, vinyl acetate, acrylonitrile, acrylamide, vinyl chloride, vinyl fluoride, vinylidene difluoride, 1-fluoro-2-chloro-ethylene, 1-chloro-2,2-difluoroethylene, chlorotrifluoroethylene, trifluoroethylene, tertrafluoroethylene, hexafluoropropene, styrene, alpha-methyl styrene, substituted styrene, trimethoxyvinylsilane, triethoxyvinylsilane and the like. These radical polymerizable monomers can be used either singly or as a combination of two or more monomers. The numbers x, y and z represent the number of repeating monomer units in each polymer block, and typically x, y and z, independently, would be from about 10 to about 100,000. Preferably, x, y, and z, independently, would be from about 20 to about 30,000, most preferably from about 50 to about 10,000. Basically, similar living radical polymerization reactions occur sequentially, first with the first monomer (or mixture of monomers), then with the second monomer (or mixture of monomers), then with the third monomer (or mixture of monomers), and so on, to form diblock, triblock, etc. copolymers having a narrow molecular weight distribution, i.e. Mw/Mn <2.0, typically <1.8, and preferably <1.5, and most preferably <1.2. As shown in FIG. 5, a poly(methyl methacrylate-b-butyl methacrylate) diblock copolymer (graph b) exhibited almost twice the molecular weight of a poly(methyl methacrylate) homopolymer (graph a), without changing the narrow molecular weight distribution. The copolymer composition was basically controlled by monomer feed ratio.

In accordance with another aspect of the present invention, one of the major advantages of alkylperoxydiarylborane initiators resides in the ability to synthesize initiators containing multiple active sites. Thus, by means of a simple hydroboration reaction of a molecule containing multiple olefinic double bonds with a diarylborane, followed by the spontaneous and selective oxidation reaction by oxygen at ambient temperature (as discussed above). The following equation illustrates the preparation of a difunctional initiator α,ω-bis(9-peroxyborafluorene)hexane.

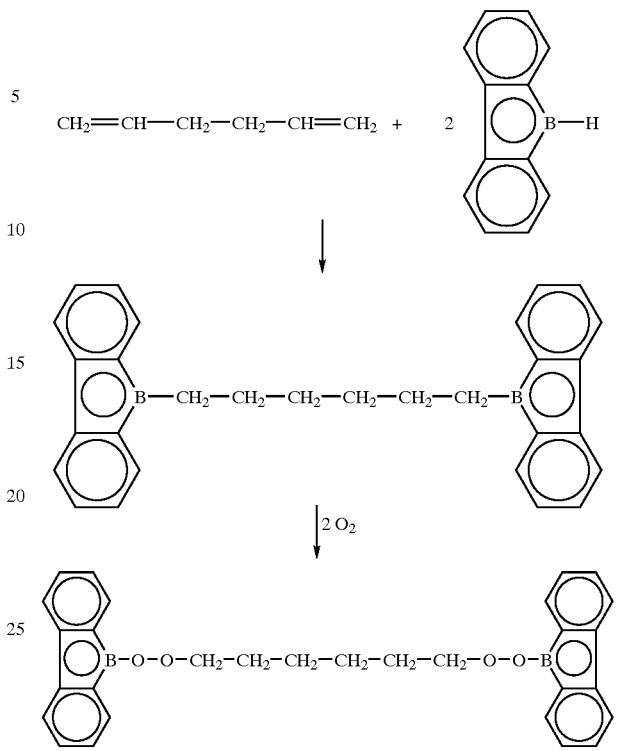

The difunctional initiator having two active sites may be used to initiate a living free radical polymerization to produce high molecular weight polymers within shorter reaction time. It is especially useful in a process for preparing the symmetrical triblock (A—B—A) copolymers containing two A end blocks and one B center block. For example, the above difunctional initiator α,ω-bis(9-peroxyborafluorene)hexane is dissolved in monomer B to form a reaction solution which is polymerized and forms a telechelic polymer (macroinitiator) containing two active end groups. The macroinitiator is then contected with monomer A to form second reaction solution that is polymerized to form an A—B—A triblock copolymer.

Furthermore, the chemistry is easily extended to the preparation of multiple functional initiators, containing more than two active sites. The reaction involves a compound having multiple olefinically unsaturated sites and the same hydroboration reaction of the olefinic sites with a sufficient quantity of diarylborane. The multiple functional initiators are very useful for preparing star-shape polymers having multiple arms, wherein the number of arms is the same as the number of active sites in the initiator, and wherein each arm typically contains from about 10 to about 100,000 repeating monomer units. Preferably each arm contains from about 20 to about 30,000, and most preferably from about 50 to about 10,000 repeating monomer units.

In addition, by using the above-discussed sequential monomer addition process, it is also possible to prepare multiple blocks in each arm of a star polymer. In general, the combination of living radical polymerization and easy synthesis of multiple functional initiator opens up a wealth of possibilities in the synthesis of complex polymer architectures.

The following examples are illustrative of the principles and practice of this invention.

EXAMPLE 1

Synthesis of 2,2'-Dibromobiphenyl

To a stirred solution of 38.15 g (0.16 mol) of o-dibromobenzene in 350 ml of anhydrous tetrahydrofuran (THF) at −80° C. was added 50.5 ml of a 1.6 M solution of n-butyllithium in pentane. The rate of addition was such that the temperature was not allowed to rise more than 5° C. After the solution was stirred for 2.5 hours at −78° C., the yellow-green reaction mixture was gradually warmed up to −5° C. over a period of 8 hours, and then was hydrolyzed with 100 ml of 5% hydrochloric acid. The resulting layers were separated and the aqueous layer was extracted with three 50 ml portions of ether. The ether solution, together with the original organic layer, was dried over anhydrous sodium sulfate, and filtered. After the removal of the solvent under vacuum, the residue was treated with 50 ml of anhydrous ethanol and cooled down to 31 40° C. to yield 17.9 g (70% yield) of 2,2'-dibromobiphenyl. One recrystallization from anhydrous ethanol gave pure 2,2'-dibromobiphenyl having a melting point (m.p.) 80.8° C. The molecular structure was determined by $^1$H NMR measurement in CDCl$_3$ solvent. $^1$H NMR spectra of the pure 2,2'-dibromobiphenyl (CDCl$_3$ at 25° C.) was as follows: δ7.70 (d, 1H, aromatic H), 7.38 (m, 1H, aromatic H), 7.25 (m, 2H, aromatic H).

EXAMPLE 2

Synthesis of 9-Chloroborafluorene

A solution of 5.0 g (16.03 mmol) of 2,2'-dibromobiphenyl in 100 ml of diethyl ether was cooled to −10° C. To this solution, a solution of 1.6 M n-butyllithium (32.05 mmol) in hexane (21 ml) was added dropwise. After the solution was stirred for 2 hours at −10° C., the yellow reaction mixture was gradually warmed up to −5° C. for 4 hours. Volatiles were then removed under vacuum. The residue was washed with anhydrous hexane, filtered to remove lithium bromide, and dried under vacuum, leaving 2.61 g of dilithiobiphenyl (98% yield) as a colorless powder.

To a solution of dilithiobiphenyl (2.61 g, 15.71 mmol) in hexane (100 ml) at −10° C. was added dropwise a solution of 1.0 M boron trichloride (15.8 ml) in hexane over a period of 2 hours. The reaction solution was stirred at −10° C. for 5 hours, and slowly warmed to room temperature, and then stirred overnight. After removal of the solvent under very high vacuum, the product residue was washed with highly pure hexane, filtered and dried under very high vacuum to give 2.18 g (70% yield) of pure 9-chloroborafluorene as an yellow powder. The molecular structure was determined by $^1$H, $^{13}$C and $^{11}$B NMR measurements in CDCl$_3$ solvent. $^1$H NMR spectra of the pure 9-chloroborafluorene product (CDCl$_3$, 25° C.) was as follows: δ7.65 (m, 1H, aromatic H), 7.35 (m, 2H, aromatic H), 7.15 (m, 2H, aromatic H). $^{13}$C NMR spectra of the pure 9-chloroborafluorene product (CDCl$_3$, 25° C.) was as follows: δ153.52, 135.35, 132.99, 129.31, 120.57. $^{11}$B NMR spectra of the pure 9-chloroborafluorene product (CDCl$_3$, 25° C.) was as follows: δ63.85.

EXAMPLE 3

Synthesis of Bis(9-Borafluorene)

To a solution of 9-chloroborafluorene (1.93 g, 9.8 mmol) in THF (80 mL) at −78° C. was added dropwise a solution of 1.0 M sodium triethylborohydride (9.8 ml) in THF using a syringe over a period of 2 hours. The reaction solution was stirred at −78° C. for 2 hours, and slowly warmed to room temperature, and then stirred overnight. After the removal of the solvent under very high vacuum, the product residue was washed with high purity THF, filtered and dried under very high vacuum to give 1.12 g (35% yield) of a purified colorless bis-(9-borafluorene) powder. The molecular structure was determined by $^1$H, $^{13}$C and $^{11}$B NMR measurements in CDCl$_3$ solvent. $^1$H NMR spectra (CDCl$_3$, 25° C.) was as follows: δ8.45 (br s, 2H, B—H), 7.42 (m, 1H, aromatic H), 7.21 (m, 2H, aromatic H), 7.02 (m, 2H, aromatic H). $^{13}$C NMR spectra (CDCl$_3$, 25° C.) was as follows: δ147.52, 135.15, 132.89, 129.31, 120.19. $^{11}$B NMR spectra (C$_6$D$_6$, 25° C.) was as follows: δ58.20 (minor species, monomeric B—H), 20.12 (major peak, dimer B$_2$H$_2$).

EXAMPLE 4

Synthesis of 1-Octyl-9-Borafluorene

To a solution of bis(9-borafluorene) (1.12 g, 3.43 mmol) in rigorously anhydrous/anaerobic THF (50 ml) at 50° C. was added dropwise an excess amount of 1-octene (5.0 ml) using a syringe. After stirring for 5 hours, the solvent was removed under very high vacuum. The product residue was then washed with highly purity THF, filtered in a highly purified dry box and dried under very high vacuum to give 1.85 g (98% yield) of a purified colorless 1-octyl-9-borafluorene. The molecular structure was determined by $^1$H and $^{11}$B NMR measurements in CDCl$_3$ solvent. $^1$H NMR spectra of the 1-octyl-9-borafluorene (CDCl$_3$, 25° C.) was as follows: δ7.49 (m, 1H, aromatic H), 7.30 (m, 2H, aromatic H), 7.12 (m, 2H, aromatic H), 1.69 (tr, 2H, BCH$_2$), 1.38 (m, 2H, BCH$_2$CH$_2$), 1.18 (m, 10H, CH$_2$), 0.75 (tr, 3H, CH$_3$). $^{11}$B NMR spectra (C$_6$D$_6$, 25° C.) was as follows: δ60.17.

EXAMPLE 5

Synthesis of 1-Octylperoxy-9-Borafluorene

To a stirred suspension of 1-octyl-9-borafluorene (1.12 g, 3.43 mmol) in rigorously anhydrous/anaerobic benzene (50 ml) at 20° C., 84 ml of oxygen (at ambient temperature, 1 atmosphere pressure) was added using a syringe. The mixture was stirred for 3 hours. Evaporation of volatiles under very high vacuum line afforded 1.0 g (95% yield) of 1-octyl-9-borafluorene oxidation adduct as a colorless viscous product. The molecular structure of resulting 1-octylperoxy-9-borafluorene was determined by $^1$H, $^{13}$C and $^{11}$B NMR measurements in CDCl$_3$ solvent. $^1$H NMR spectra of the 1-octylperoxy-9-borafluorene product (CDCl$_3$, 25° C.) was as follows: δ7.37 (m, 1H, aromatic H), 7.20 (m, 2H, aromatic H), 7.00 (m, 2H, aromatic H), 3.45 (m, 2H, OCH$_2$), 1.39 (m, 2H, OCH$_2$CH$_2$), 1.15 (m, 10H, CH$_2$), 0.78 (tr, 3H, CH$_3$). $^{13}$C NMR spectra (CDCl$_3$, 25° C.) was as follows: δ149.12, 136.25, 132.89, 129.19, 120.57, 69.76, 32.98, 32.42, 29.93, 26.16, 22.95, 14.31. $^{11}$B NMR spectra (C$_6$D$_6$, 25° C.): δ41.94.

EXAMPLE 6

Polymerization of Methyl Methacrylate (MMA)

A 100 ml reactor equipped with a magnetic stirrer was attached to a high-vacuum line, and then sealed under a nitrogen atmosphere. Fresh anhydrous/anaerobic THF (40 ml) and highly purified MMA (10 ml) were introduced via a syringe at 20° C. The reactor was placed in a bath at 20° C., and stirred for 10 min. The 1-octylperoxy-9-borafluorene (0.026 g) initiator in THF solution was then added, and the mixture was stirred for 10 hours. The polymerization was quenched with acidic methanol, and the precipitated polymer (PMMA) was collected, washed, and dried in a vacuum oven at 60° C. The conversion of MMA was 17.4%, and the number average molecular weight and molecular weight distribution of the resulting polymer were 18,800 g/mol and 1.21, respectively.

EXAMPLES 7–19

Polymerization of Methyl Methacrylate (MMA)

In a series of examples, following the procedures described in Example 6, a 100 mL reactor equipped with a magnetic stirrer was attached to a high-vacuum line, and then was sealed under a nitrogen atmosphere. Fresh anhydrous/anaerobic THF (40 mL) was introduced via a syringe at 20° C., followed by adding the amount of MMA indicated in Tables 1 and 2. The reactor was placed in a bath at 20° C., and stirred for 10 min. The indicated amount of 1-octylperoxy-9-borafluorene solution in THF was then added, and the mixture was stirred for the indicated reaction time. The polymerization was quenched with acidic methanol, and the precipitated polymer (PMMA) was collected, washed, and dried in a vacuum oven at 60° C. The polymers were characterized by Gel Permeation Chromatography (GPC), Differential Scanning Calorimetry (DSC) and NMR. The results for the series of examples are summarized in Tables 1 and 2.

TABLE 1

Polymerization of MMA[a] by using 1-octylperoxy-9-borafluorene (1.72 mmol/l)

| Example | Reaction Time (hr) | Monomer Conversion (%) | $M_n$(Exp.) | $M_n$(Cal.) | $M_w/M_n$ (PDI) |
|---|---|---|---|---|---|
| 7 | 2 | 2.3 | 2500 | 2534 | 1.17 |
| 8 | 5 | 5.0 | 5300 | 5509 | 1.19 |
| 9 | 10 | 17.4 | 18090 | 19170 | 1.21 |
| 10 | 18 | 33.9 | 36070 | 37348 | 1.18 |
| 11 | 24 | 50.8 | 54750 | 55967 | 1.35 |
| 12[b] | 24 | 54.4 | 86100 | 89867 | 1.46 |

[a]Polymerization conditions: [MMA] = 1.87M (10 ml), solvent (THF) = 40 ml,
[b][MMA] = 2.81M (15 ml).

TABLE 2

Polymerization of MMA[a] by using 1-octylperoxy-9-borafluorene (6.43 mmol/l)

| Example | Reaction Time (hr) | Monomer Conversion (%) | $M_n$(Exp.) | $M_n$(Cal.) | $M_w/M_n$ (PDI) |
|---|---|---|---|---|---|
| 13 | 3 | 9.1 | 2500 | 2619 | 1.14 |
| 14 | 6 | 18.5 | 5300 | 5370 | 1.19 |
| 15 | 10 | 35.2 | 11080 | 10218 | 1.21 |
| 16 | 16 | 56.7 | 17070 | 16458 | 1.15 |
| 17 | 20 | 65.5 | 20750 | 19013 | 1.35 |
| 18 | 28 | 85.3 | 25100 | 24760 | 1.20 |
| 19 | 28[b] | 86.8[b] | 38900 | 37780 | 1.25 |

[a]Polymerization conditions: [MMA] = 1.87M (10 ml), solvent (THF) = 40 ml,
[b][MMA] = 2.81M (15 ml).

EXAMPLE 20

Polymerization of Butyl Methacrylate (BMA)

A 100 ml reactor equipped with a magnetic stirrer was attached to a high-vacuum line, and then sealed under a nitrogen atmosphere. Fresh anhydrous/anaerobic THF (40 ml) and highly purified BMA (1.26 M) were introduced via a syringe at 20° C. The reactor was placed in a bath at 20° C., and stirred for 10 min. 1-octylperoxy-9-borafluorene solution in THF (1.72 mmol/1) was then added, and the mixture was stirred for 1 hour. The polymerization was quenched with acidic methanol, and the precipitated polymer (PBMA) was collected, washed, and dried in a vacuum oven at 60° C. The conversion of BMA was 1.2%, and the number average molecular weight and molecular weight distribution of polymers, as determined by GPC, were 1365 g/mol and 1.19, respectively.

EXAMPLES 21–29

Polymerization of Butyl Methacrylate (BMA).

In a series of examples, following the procedures described in Example 20, a 100 ml reactor equipped with a magnetic stirrer was attached to a high-vacuum line, and then sealed under a nitrogen atmosphere. Fresh anhydrous/anaerobic THF (40 ml) was introduced via a syringe at 20° C., followed by adding the amount of BMA indicated in Table 3. The reactor was placed in a bath at 20° C., and stirred for 10 min. The indicated amount of 1-octylperoxy-9-borafluorene solution in THF was then added, and the mixture was stirred for the indicated reaction time. The polymerization was quenched with acidic methanol, and the precipitated polymer (PBMA) was collected, washed, and dried in a vacuum oven at 60° C. The polymer product obtained in example was characterized by GPC and DSC and NMR. These results are summarized in Table 3.

TABLE 3

Polymerization of butyl methacrylate (BMA) using 1-octylperoxy-9-borafluorene

| Example | Reaction Time (hr) | Monomer Conversion (%) | $M_n$(Exp.) | $M_n$(Cal.) | $M_w/M_n$ (PDI) |
|---|---|---|---|---|---|
| 21 | 1 | 1.2 | 1360 | 1263 | 1.19 |
| 22 | 3 | 3.0 | 3500 | 3153 | 1.17 |
| 23 | 6 | 6.7 | 4870 | 4966 | 1.21 |
| 24 | 8 | 13.2 | 14110 | 13895 | 1.18 |
| 25 | 10 | 19.5 | 21380 | 20527 | 1.18 |
| 26 | 14 | 29.8 | 32180 | 31369 | 1.41 |
| 27 | 24 | 53.4 | 57310 | 56212 | 1.37 |
| 28 | 36 | 69.5 | 74150 | 73159 | 1.20 |
| 29 | 48 | 88.4 | 95380 | 93054 | 1.22 |

[a]Polymerization conditions: [MMA] = 1.26M (10 ml), solvent (THF) = 40 ml, [1-octylperoxy-9-borafluorene] = 1.72 mmol/l.

EXAMPLE 30

Diblock Polymerization of Methyl Methacrylate and Butyl Methacrylate

A 100 ml reactor equipped with a magnetic stirrer was attached to a high-vacuum line, and then sealed under a nitrogen atmosphere. Fresh anhydrous/anaerobic THF (40 ml) and highly purified MMA (1.86 M) were introduced via a syringe at 20° C. The reactor was placed in a bath at 20° C., and stirred for 10 min. 1-octylperoxy-9-borafluorene solution in TMF (6.43 mmol/1) was then added, and the mixture was stirred for 10 hours. The volatiles, including benzene and MMA monomer, were rapidly evaporated under high vacuum (below 50 millitorr). A sample of the polymer (PMMA) was taken from the reactor GPC analysis. A mixture of benzene (50 mL) and butyl methacrylate (BMA) (1.26 M) was then introduced into the reactor (via syringe) as quickly as possible. Copolymerization was begun at 20° C. and continued for another 10 hours. The copolymerization was quenched with acidic methanol, and the precipitated polymer PMMA-b-PBMA was collected, washed, and dried in a vacuum oven at 60° C. GPC measurements on the sample of the PMMA polymer that was taken from the reactor showed that the PMMA had a number average molecular weight and a molecular weight distribution of 12,100 g/mol and 1.23, respectively. The number average molecular weight and molecular weight distribution of PMMA-b-PBMA diblock copolymer were 20,100 g/mol and 1.35, respectively.

EXAMPLE 31

Diblock Polymerization of Methyl Methacrylate and Butyl Methacrylate

A 100 mL reactor equipped with a magnetic stirrer was attached to a high-vacuum line, and then sealed under a nitrogen atmosphere. Fresh anhydrous/anaerobic THF (40 mL) and highly purified MMA (10 ml) were introduced via a syringe at 20° C. The reactor was placed in a bath at 20° C, and stirred for 10 min. The 1-octylperoxy-9-borafluorene initiator (6.43 mmol) in THF solution was then added, and the mixture was stirred for 5 h. The volatiles, including benzene and MMA monomer, were rapidly evaporated under high vacuum (below 50 millitorr) and a sample of polymer (PMMA) was taken from the reactor for GPC analysis. A mixture of benzene (50 mL) and butyl methacrylate (BMA) (10 ml) was introduced into the reactor (via syringe) as quickly as possible. Copolymerization was begun at 20° C. and continued for another 5 h. The copolymerization was quenched with acidic methanol, and the precipitated polymer (PMMA-b-PBMA) was collected, washed, and dried in a vacuum oven at 60° C. The number average molecular weight and molecular weight distribution of PMMA polymer were 5500 g/mol and 1.21, respectively. The number average molecular weight and molecular weight distribution of PMMA-b-PBMA diblock copolymer were 10200 g/mol and 1.25, respectively.

EXAMPLE 32

Synthesis of α,ω-Bis(9-peroxyborafluorene)octane

To a solution of 9-borafluorene (2.3 g, 7 mmol) in rigorously anhydrous/anaerobic THF (100 ml) at 50° C. was added dropwise α,ω-octadiene (3.5 mmol) using a syringe. After stirring for 5 hours, the solvent was removed under very high vacuum. The product residue was then washed with highly purity THF, filtered in a highly purified dry box and dried under very high vacuum to give 2.97 g (97% yield) of a purified colorless α,ω-bis(9-borafluorene)octane. The molecular structure was determined by $^1$H and $^{11}$B NMR measurements in CDCl$_3$ solvent.

The oxygen oxidation reaction was carried out by suspending the formed α,ω-bis(9-borafluorene)octane in rigorously anhydrous/anaerobic benzene (100 ml) at 20° C., and adding 320 ml of oxygen (at ambient temperature, 1 atmosphere pressure) using a syringe. The mixture was stirred for 3 hours. Evaporation of volatiles under very high vacuum line afforded 3.1 g (97% yield) of α,ω-bis(9-peroxyborafluorene)octane as a colorless viscous product. The molecular structure of resulting α,ω-bis(9-peroxyborafluorene)octane was determined by $^1$H, $^{13}$C and $^{11}$B NMR measurements in CDCl$_3$ solvent.

EXAMPLE 33

Triblock Polymerization of PMMA-b-PBMA-b-PMMA

A 200 ml reactor equipped with a magnetic stirrer was attached to a high-vacuum line, and then sealed under a nitrogen atmosphere. Benzene (100 ml) and highly purified butyl methacrylate (BMA) (30 ml) were introduced via a syringe at 20° C. The reactor was placed in a bath at 20° C., and stirred for 10 min. 0.4 g of the α,ω-bis(9-peroxyborafluorene)octane difunctional initiator prepared in Example 32 in THF solution was then added, and the mixture was stirred for 10 hours. The volatiles, including benzene, THF and the unreacted BMA monomer, were rapidly evaporated under high vacuum (below 10 millitorr). A small sample of polymer (PBMA) was taken from the reactor for GPC analysis and was found to have a molecular weight about 18,500 g/mole. A mixture of anhydrous/anaerobic THF (100 mL) and methyl methacrylate (MMA) (15 ml) was introduced into the reactor (via syringe) as quickly as possible. Copolymerization was begun at 20° C. and continued for another 10 hours. The copolymerization was quenched with acidic methanol, and the precipitated triblock polymer PMMA-b-PBMA-b-PMMA was collected, washed, and dried in a vacuum oven at 60° C. The number average molecular weight and molecular weight distribution of the triblock polymer were 25,400 g/mol and 1.28, respectively.

What is claimed is:

1. A living free radical initiator having the general formula.

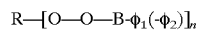

wherein n is from 1 to 4, R is a hydrogen or a linear, branched or cyclic alkyl radical having a molecular weight from 1 to about 500, and $\phi_1$ and $\phi_2$, independently, are selected from aryl radicals, based on phenyl or substituted phenyl groups, with the proviso that $\phi_1$ and $\phi_2$, can be the chemically bridged to each other with a linking group or with a direct chemical bond between the two aryl groups to form a cyclic ring structure that includes a boron atom.

2. The living free radical initiator according to claim 1, having the general formula I or II:

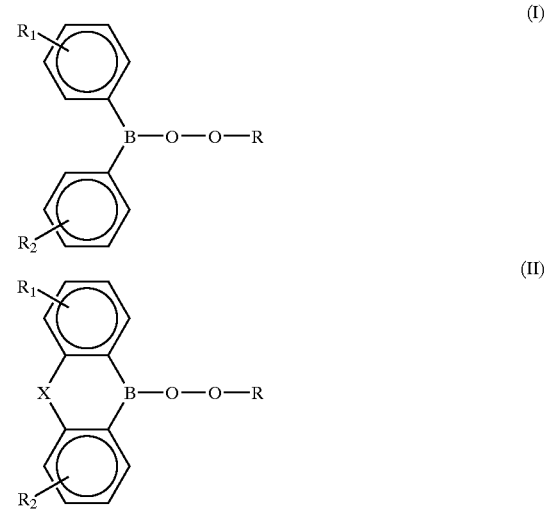

wherein, $R_1$ and $R_2$ in compounds (I) and (II), independently, represent H or an alkyl, aryl or alkoxyl substituent having from 1 to 8 carbon atoms, with $R_1$ and $R_2$ being located at all available substitution locations; and wherein X in compound (II) is selected from a direct chemical bond, —O—, —N(R")—, —Si(R"$_2$)—, and —(CH$_2$)$_m$—, with R" being a C$_1$–C$_2$ alkyl group and m being 1, 2 or 3.

3. The living free radical initiator according to claim 1, which comprises an alkylperoxydimesitylborane.

4. The living free radical initiator according to claim 1, which comprises a 9-alkylperoxy-borafluorene.

5. The living free radical initiator according to claim 1, which comprises a 1-alkylperoxy-2,3;5,6-dibenzoborine.

6. The living free radical initiator according to claim 1, which comprises a 1-alkylperoxy-2,3;6,7-bibenzoborepin.

7. The living free radical initiator according to claim 1, which comprises a 1-alkylperoxy-2,3;6,7-bibenzodihydroborepin.

* * * * *

UNITED STATES PATENT AND TRADEMARK OFFICE
CERTIFICATE OF CORRECTION

PATENT NO.    : 6,420,502 B1
DATED         : July 16, 2002
INVENTOR(S)   : Tze-Chiang Chung It is certified that error appears in the above-identified patent and that said Letters Patent is hereby corrected as shown below:

Column 1,
Line 8, after "RELATED APPLICATIONS", and before "FIELD OF INVENTION" insert the following:
-- GOVERNMENT SPONSORSHIP
    This invetion was made with support from the Government under Contract No. N00014-99-1-0443. The Government has certain rights in the invention. --

Signed and Sealed this

Twenty-sixth Day of April, 2005

JON W. DUDAS
*Director of the United States Patent and Trademark Office*